(12) United States Patent
Masuda (10) Patent No.: US 11,693,303 B2
(45) Date of Patent: Jul. 4, 2023

(54) WAVELENGTH CONVERTER, LIGHT SOURCE APPARATUS, AND PROJECTOR

(71) Applicant: SEIKO EPSON CORPORATION, Tokyo (JP)

(72) Inventor: Masaya Masuda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/865,605

(22) Filed: Jul. 15, 2022

(65) Prior Publication Data

US 2023/0020842 A1    Jan. 19, 2023

(30) Foreign Application Priority Data

Jul. 15, 2021    (JP) .................................. 2021-117027

(51) Int. Cl.
  *G03B 21/20*    (2006.01)
(52) U.S. Cl.
  CPC .................................. *G03B 21/204* (2013.01)
(58) Field of Classification Search
  CPC .................................................. G03B 21/204
  See application file for complete search history.

(56) References Cited

U.S. PATENT DOCUMENTS

| 10,914,453 | B2* | 2/2021 | Egawa | ...................... H04N 5/74 |
| 2010/0315320 | A1* | 12/2010 | Yoshida | ............ G02F 1/133617 345/83 |
| 2018/0095349 | A1* | 4/2018 | Egawa | ................. H04N 9/3161 |
| 2019/0302591 | A1* | 10/2019 | Nojima | .............. G03B 21/2066 |
| 2019/0339604 | A1 | 11/2019 | Takeuchi | |
| 2023/0040423 | A1* | 2/2023 | Maeda | ................. G03B 21/204 |

FOREIGN PATENT DOCUMENTS

| JP | 2016-066764 A | 4/2016 |
| JP | 2018-132746 A | 8/2018 |
| JP | 2019-175570 A | 10/2019 |

\* cited by examiner

*Primary Examiner* — Jong-Suk (James) Lee
*Assistant Examiner* — Glenn Zimmerman
(74) *Attorney, Agent, or Firm* — Dority & Manning, P.A.

(57) ABSTRACT

A wavelength converter includes a base having a first surface, a wavelength conversion part that has a second surface facing the first surface and converts first light that belongs to a second wavelength band into fluorescence that belongs to a second wavelength band different from the first wavelength band, junctions that join the wavelength conversion part and the base to each other, and an air layer located in a region that the first light enters and surrounded by the wavelength conversion part, the base, and the junctions. The first surface of the base has a first region curved in a direction, and the second surface of the wavelength conversion part has a second region facing the first region and curved in the same direction.

7 Claims, 5 Drawing Sheets

WAVELENGTH CONVERTER, LIGHT SOURCE APPARATUS, AND PROJECTOR

The present application is based on, and claims priority from JP Application Serial Number 2021-117027, filed Jul. 15, 2021, the disclosure of which is hereby incorporated by reference herein in its entirety.

BACKGROUND

1. Technical Field

The present disclosure relates to a wavelength converter, a light source apparatus, and a projector.

2. Related Art

JP-A-2019-175570 discloses a wavelength converter including a base having a reflection surface, a wavelength conversion layer, a junction that joins the base and the wavelength conversion layer to each other, and an air layer surrounded by the base, the junction, and the wavelength conversion layer. Rotation of the wavelength converter allows air to enter the air layer and cool the wavelength converter.

In the wavelength converter described in JP-A-2019-175570, however, when the wavelength conversion layer is distorted, the thickness of the air layer becomes uneven due to the distortion and other factors, resulting in a decrease in cooling efficiency.

SUMMARY

A wavelength converter includes a base having a first surface, a wavelength conversion part that has a second surface facing the first surface and converts excitation light that belongs to a first wavelength band into light that belongs to a second wavelength band different from the first wavelength band, a junction that joins the wavelength conversion part and the base to each other, and an air layer located in a region that the excitation light enters and surrounded by the wavelength conversion part, the base, and the junction. The first surface of the base has a first region curved in a first direction, and the second surface of the wavelength conversion part has a second region facing the first region and curved in the first direction.

A light source apparatus includes the wavelength converter according described above and a light emitter that outputs the excitation light.

A projector includes the light source apparatus described above, an exterior enclosure, a light modulator that modulates light outputted from the light source apparatus in accordance with image information, and a projection optical apparatus that projects the light modulated by the light modulator.

DESCRIPTION OF EXEMPLARY EMBODIMENTS

The configuration of a projector 1000 will first be described with reference to FIG. 1.

Figure 1:
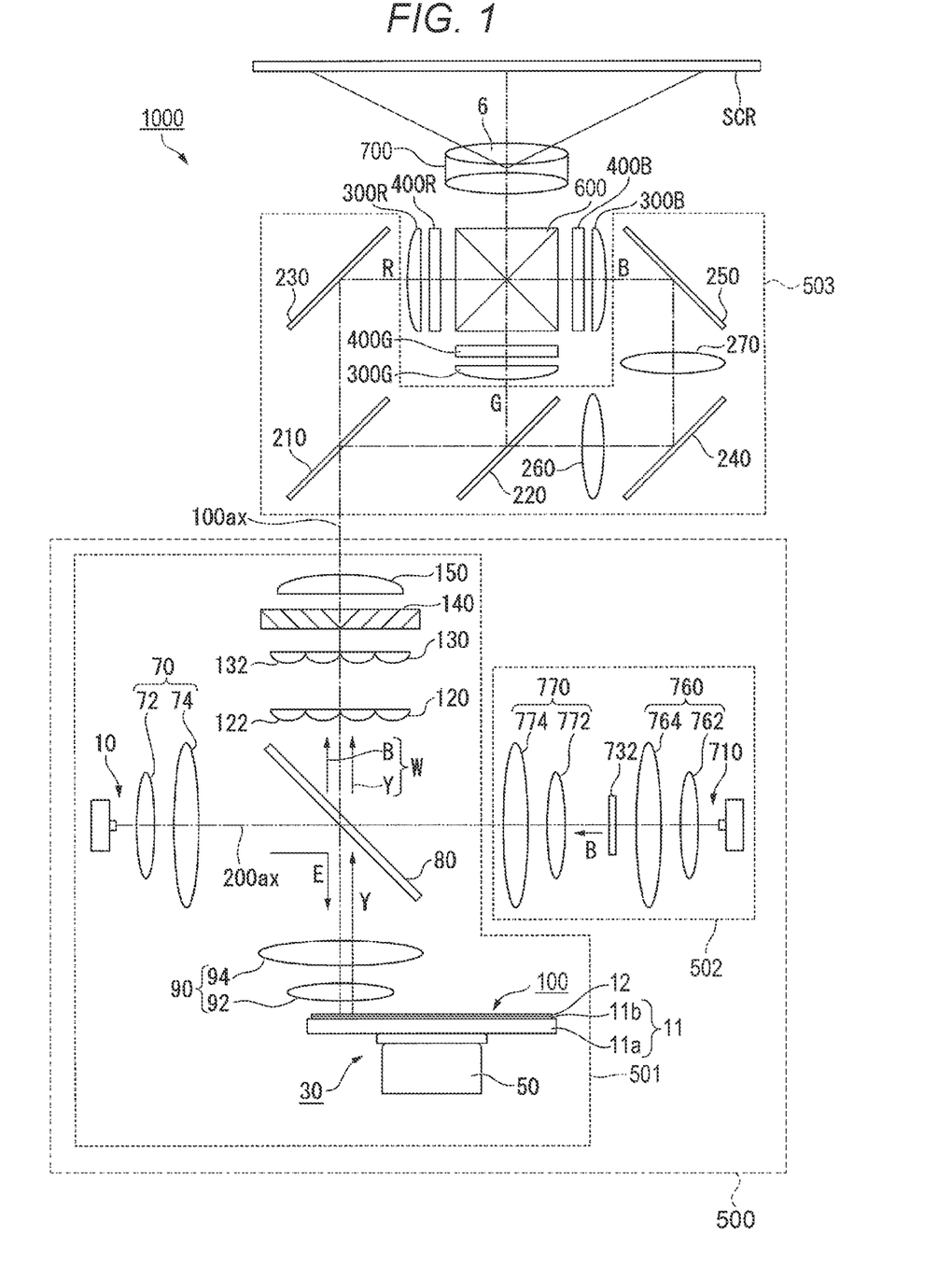
FIG. 1 is a schematic view showing the configuration of a projector.

The projector 1000 includes a first illuminator 501, a second illuminator 502, a color separation/light guide system 503, a light modulator 400R, a light modulator 400G, a light modulator 400B, a light combiner 600, and a projection optical apparatus 700, which are all disposed in an exterior enclosure that is not shown, as shown in FIG. 1. The first illuminator 501 and the second illuminator 502 are collectively referred to as a light source apparatus 500.

The first illuminator 501 includes a first light source 10 as a light emitter, a collimation system 70, a dichroic mirror 80, a collimation/light collection system 90, a wavelength conversion apparatus 30, a first lens array 120, a second lens array 130, a polarization converter 140, and a superimposing lens 150.

The first light source 10 is formed of a semiconductor laser that outputs blue excitation light E, which has intensity that peaks, for example, at 445 nm and which belongs to a first wavelength band ranging, for example, from 440 to 450 nm. The first light source 10 may be formed of one semiconductor laser or a plurality of semiconductor lasers.

The first light source 10 is so disposed that an optical axis 200ax of the laser light outputted from the first light source 10 is perpendicular to an illumination optical axis 100ax. The first light source 10 can instead be a semiconductor laser that outputs excitation light having a peak wavelength other than 445 nm, for example, a peak wavelength of 460 nm.

The collimation system 70 includes a first lens 72 and a second lens 74. The collimation system 70 substantially parallelizes the light outputted from the first light source 10. The first lens 72 and the second lens 74 are each formed of a convex lens.

The dichroic mirror 80 is disposed in the optical path between the collimation system 70 and the collimation/light collection system 90 and oriented so as to intersect with the optical axis 200ax of the first light source 10 and the illumination optical axis 100ax at an angle of 45°. The dichroic mirror 80 reflects the excitation light E and transmits yellow fluorescence Y containing a red light component and a green light component.

The collimation/light collection system 90 has the function of collecting the excitation light E having passed through the dichroic mirror 80 and causing the collected excitation light E to enter a wavelength conversion layer 12a of the wavelength conversion apparatus 30 and the function of substantially parallelizing the fluorescence Y emitted from the wavelength conversion apparatus 30. The collimation/light collection system 90 includes a first lens 92 and a second lens 94. The first lens 92 and the second lens 94 are each formed of a convex lens.

The specific configuration of the wavelength conversion apparatus 30, which form the first illuminator 501, will be described later with reference to FIGS. 2 and 3.

The second illuminator 502 includes a second light source 710, a light collection system 760, a diffuser 732, and a collimation system 770.

The second light source 710 is formed of a semiconductor laser identical to the semiconductor laser that forms the first light source 10 of the first illuminator 501. The second light source 710 may be formed of one semiconductor laser or a plurality of semiconductor lasers. The second light source 710 may instead be formed of a semiconductor laser that outputs light that belongs to a wavelength band different from the wavelength band of the light outputted from the semiconductor laser of the first light source 10.

The light collection system 760 includes a first lens 762 and a second lens 764. The light collection system 760 collects blue light B outputted from the second light source 710 and brings the collected blue light B to a diffusion surface of the diffuser 732 or in the vicinity of the diffuser 732. The first lens 762 and the second lens 764 are each formed of a convex lens.

The diffuser 732 diffuses the blue light B from the second light source 710 to produce blue light B having a light orientation distribution close to the light orientation distribution of the fluorescence Y emitted from the wavelength conversion apparatus 30. The diffuser 732 can, for example, be a ground glass plate made of optical glass.

The collimation system 770 includes a first lens 772 and a second lens 774. The collimation system 770 substantially parallelizes the light having exited out of the diffuser 732. The first lens 772 and the second lens 774 are each formed of a convex lens.

The blue light B outputted from the second illuminator 502 is reflected off the dichroic mirror 80 and combined with the fluorescence Y having been outputted from the wavelength conversion apparatus 30 and having passed through the dichroic mirror 80 into white light W. The white light W enters the first lens array 120.

The first lens array 120 includes a plurality of first lenses 122, which divide the light from the dichroic mirror 80 into a plurality of sub-luminous fluxes. The plurality of first lenses 122 are arranged in a matrix in a plane perpendicular to the illumination optical axis 100ax.

The second lens array 130 includes a plurality of second lenses 132 corresponding to the plurality of first lenses 122 of the first lens array 120. The second lens array 130 along with the downstream superimposing lens 150 brings images of the first lenses 122, which form the first lens array 120, into focus in the vicinity of an image formation region of each of the light modulators 400R, 400G, and 400B. The plurality of second lenses 132 are arranged in a matrix in a plane perpendicular to the illumination optical axis 100ax.

The polarization converter 140 converts the plurality of divided sub-luminous fluxes from the first lens array 120 into linearly polarized luminous fluxes having an aligned polarization direction.

The superimposing lens 150 collects the sub-luminous fluxes having exited out of the polarization converter 140 and superimposes the collected sub-luminous fluxes on one another in the vicinity of the image formation region of each of the light modulators 400R, 400G, and 400B. The first lens array 120, the second lens array 130, and the superimposing lens 150 form an optical integration system that homogenizes the in-plane optical intensity distribution of the light from the wavelength conversion apparatus 30.

The color separation/light guide system 503 includes dichroic mirrors 210 and 220, reflection mirrors 230, 240, and 250, and relay lenses 260 and 270. The color separation/light guide system 503 separates the white light W produced by the first illuminator 501 and the second illuminator 502 into red light R, green light G, and blue light B, and guides the red light R, the green light G, and the blue light B to the corresponding light modulators 400R, 400G, and 400B.

A field lens 300R is disposed between the color separation/light guide system 503 and the light modulator 400R. A field lens 300G is disposed between the color separation/light guide system 503 and the light modulator 400G. A field lens 300B is disposed between the color separation/light guide system 503 and the light modulator 400B.

The dichroic mirror 210 transmits the red light component and reflects the green light component and the blue light component. The dichroic mirror 220 reflects the green light component and transmits the blue light component. The reflection mirror 230 reflects the red light component. The reflection mirrors 240 and 250 reflect the blue light component.

The red light having passed through the dichroic mirror 210 is reflected off the reflection mirror 230, passes through the field lens 300R, and is incident on the image formation region of the light modulator 400R for red light. The green light reflected off the dichroic mirror 210 is further reflected off the dichroic mirror 220, passes through the field lens 300G, and is incident on the image formation region of the light modulator 400G for green light. The blue light having passed through the dichroic mirror 220 travels via the relay lens 260, the light-incident-side reflection mirror 240, the relay lens 270, the light-exiting-side reflection mirror 250, and the field lens 300B and is incident on the image formation region of the light modulator 400B for blue light.

The light modulators 400R, 400G, and 400B each modulate the color light incident thereon in accordance with image information to form image light. The light modulators 400R, 400G, and 400B are each formed of a liquid crystal light valve. Although not shown, a light-incident-side polarizer is disposed on the light incident side of each of the light modulators 400R, 400G, and 400B. A light-exiting-side polarizer is disposed on the light exiting side of each of the light modulators 400R, 400G, and 400B.

The light comber 600 combines the image light outputted from the light modulator 400R, the image light outputted from the light modulator 400G, and the image light outputted from the light modulator 400B with one another to form full-color image light. The light combiner 600 is formed of a cross dichroic prism that is formed of four right-angled prisms bonded to each other and has a substantially square shape in a plan view. Dielectric multilayer films are formed along the substantially X-letter-shaped interfaces between the right-angled prisms bonded to each other.

The image light having exited out of the light combiner 600 is enlarged and projected by the projection optical apparatus 700 to form an image on a screen SCR. That is, the projection optical apparatus 700 projects the light modulated by the light modulators 400R, 400G, and 400B. The projection optical apparatus 700 is formed of a plurality of projection lenses 6.

The configurations of the wavelength conversion apparatus 30 and a wavelength converter 100 according to the first embodiment will next be described with reference to FIGS. 2 to 4.

Figure 2:
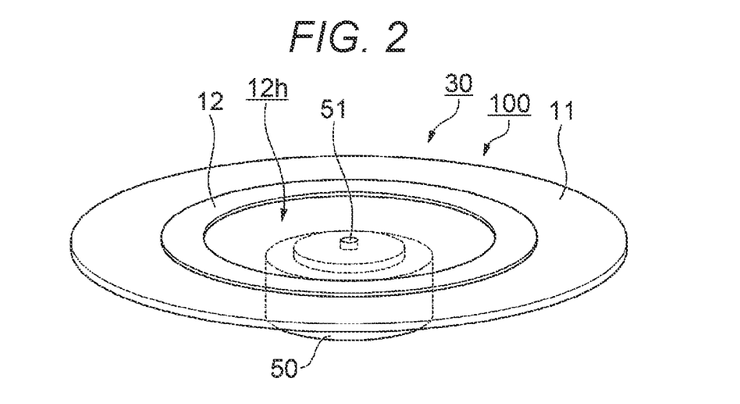
FIG. 2 is a perspective view showing the configuration of a wavelength conversion apparatus in a first embodiment.
Figure 3:
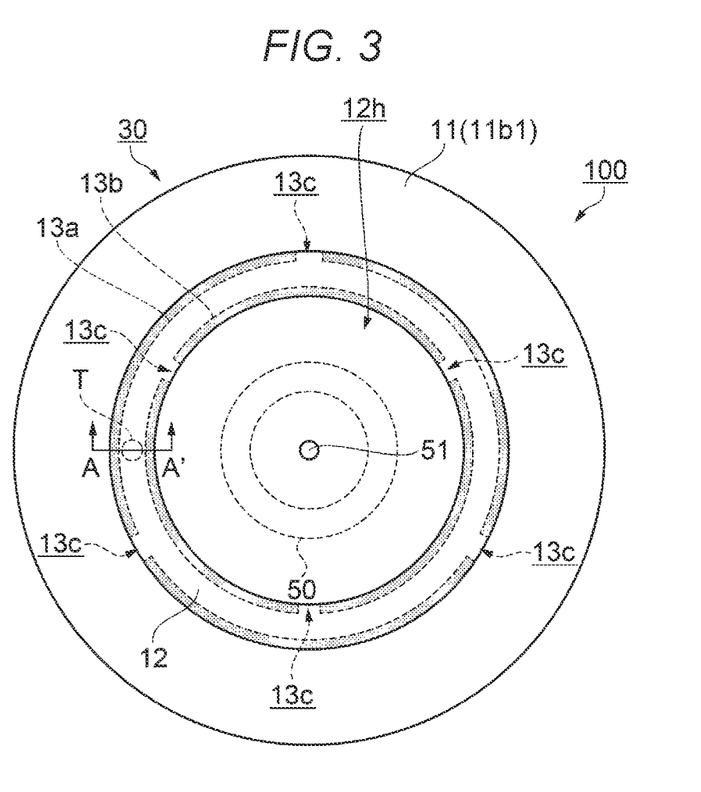
FIG. 3 is a plan view showing the configuration of the wavelength conversion apparatus.

The wavelength conversion apparatus 30 includes the wavelength converter 100 and a motor 50, as shown in FIGS. 2 and 3. The wavelength converter 100 is disposed so as to be rotatable around an axis of rotation 51. The motor 50 rotates the wavelength converter 100 around the axis of rotation 51.

Figure 4:
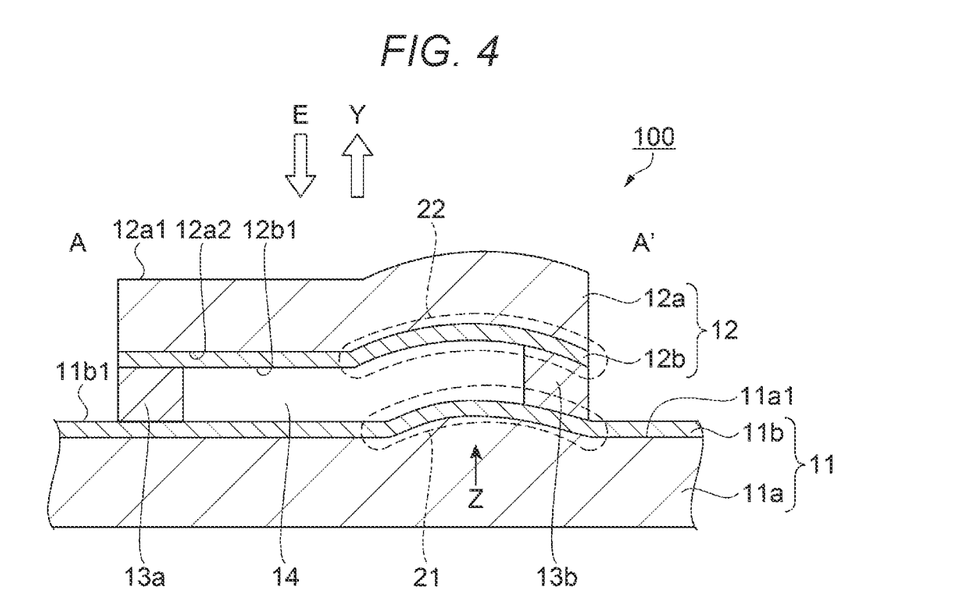
FIG. 4 is a cross-sectional view of a wavelength converter taken along the line A-A' drawn in the wavelength conversion apparatus shown in FIG. 3.

The wavelength converter 100 according to the present embodiment includes a base 11, a wavelength conversion part 12, a junction 13, and an air layer 14, as shown in FIG. 4. The wavelength converter 100 emits the fluorescence Y toward the side via which the excitation light E enters. That is, the wavelength converter 100 is a reflective wavelength converter.

The base 11 includes a base body 11a and a reflection layer 11b. The base body 11a is made of a material containing metal. As an example, the base body 11a is formed of a circular plate made of metal having high thermal conductivity, such as aluminum and copper.

The reflection layer 11b is provided across the entire surface of a first surface 11a1 of the base body 11a. The reflection layer 11b reflects the fluorescence Y emitted via a second surface 12b1 of the wavelength conversion part 12, which faces a first surface 11b1, and the excitation light E. The reflection layer 11b is made of metal having high light reflectance, for example, silver. The reflection layer 11b is designed so as to reflect the fluorescence Y and the excitation light E at high reflectance.

Therefore, to form a smooth reflection layer 11b, the first surface 11a1 of the base body 11a has a high degree of smoothness. The reflection layer 11b therefore reflects most of the fluorescence Y upward (side opposite to base body 11a) in FIG. 4. That is, the base 11 has the first surface 11b1, which is a reflection surface that reflects the fluorescence Y.

A protective film that is not shown may be provided on the light incident side of the reflection layer 11b, the side on which the excitation light E is incident. The protective film is a transparent film made, for example, of $SiO_2$ or $Al_2O_3$. The protective film, when provided, protects the reflection layer 11b from the external atmosphere and allows high-reflectance reflection of the fluorescence Y incident at a variety of angles on the surface of the base 11. A protective layer that is not shown may further be provided between the reflection layer 11b and the first surface 11a1 of the base body 11a to protect the reflective layer 11b from degradation.

The wavelength conversion part 12 has an annular shape having an opening 12h around the axis of rotation 51 of the base 11, as shown in FIGS. 2 and 3. That is, the wavelength conversion part 12 is provided on the side facing the first surface 11b1 of the base 11 so as to surround the axis of rotation 51.

The wavelength conversion part 12 includes, for example, a wavelength conversion layer 12a and a dielectric multilayer film 12b provided at a surface of the wavelength conversion layer 12a, the surface facing the first surface 11b1, as shown in FIG. 4. The wavelength conversion part 12 has a light incident surface 12a1, on which the excitation light E, which belongs to the first wavelength band, is incident, and the second surface 12b1, which is opposite to the light incident surface 12a1.

The wavelength conversion layer 12a has the light incident surface 12a1, on which the excitation light E, which belongs to the first wavelength band, is incident, and a second surface 12a2, which is opposite to the light incident surface 12a1. The wavelength conversion layer 12a contains a ceramic phosphor that converts in terms of wavelength the excitation light E into the fluorescence Y, which belongs to a wavelength band different from the wavelength band to which the excitation light E belongs. That is, the wavelength conversion layer 12a converts in terms of wavelength the excitation light E into the fluorescence Y, which belongs to a second wavelength band different from the first wavelength band. The second wavelength band ranges, for example, from 490 to 750 nm, and the fluorescence Y is yellow light containing the red light component and the green light component. The wavelength conversion layer 12a may contain a monocrystalline phosphor.

The wavelength conversion layer 12a contains, for example, an yttrium-aluminum-garnet-based (YAG-based) phosphor. Consider YAG:Ce, which contains cerium (Ce) as an activator, by way of example, and the wavelength conversion layer 12a can be made, for example, of a material produced by mixing raw powder materials containing $Y_2O_3$, $Al_2O_3$, $CeO_3$, and other constituent elements with one another and causing the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method.

The dielectric multilayer film 12b is provided at the second surface 12a2 of the wavelength conversion layer 12a. The dielectric multilayer film 12b is, for example, a film in which a plurality of $SiO_2$ layers and $TiO_2$ layers are alternately layered on each other. That is, the dielectric multilayer film 12b has a configuration in which two kinds of dielectric films having refractive indices different from each other are alternately layered on each other. The number of dielectric films that form the dielectric multilayer 12b is not particularly limited to a specific value.

When the excitation light E enters the wavelength conversion part 12, heat is generated in the wavelength conversion part 12. In the present embodiment, in which the wavelength converter 100 is rotated by the motor 50, the position where the excitation light E is incident on the wavelength conversion part 12 is moved over time. The configuration described above prevents only part of the wavelength conversion part 12 from locally heated and degraded by the excitation light E with which the same position of the wavelength conversion part 12 is irradiated all the time. In FIG. 3, the region on which the excitation light E is incident is indicated by a circle labeled with a reference character T.

Junctions 13a and 13b are provided along the outer and inner circumferences of the first surface 11a1 of the circular base 11, respectively, and join the wavelength conversion part 12 and the base 11 with each other, as shown in FIG. 4. The junctions 13a and 13b are desirably made of a transparent adhesive to suppress absorption and reflection of the light incident thereon. Examples of the adhesive of this type may include thermosetting silicone resin, epoxy resin, acrylic resin, and inorganic adhesives.

The junctions 13a and 13b are provided in regions of the light incident surface 12a1 of the wavelength conversion part 12 excluding the light incident region T, on which the excitation light E is incident. The air layer 14 is thus provided in a substantially central portion of the wavelength conversion part 12, where the first surface 11b1 of the base 11 and the second surface 12b1 of the wavelength conversion part 12 are separate from each other. In other words, the air layer 14 is the space located in the region that the excitation light E enters and surrounded by the wavelength conversion part 12, the base 11, and the junctions 13a and 13b.

The junctions 13a and 13b are each discontinuous in portions of the circumference thereof and therefore have a plurality of openings 13c, as shown in FIG. 3. The apertures 13c provided in the junctions 13a and 13b make the space surrounded by the base 11, the wavelength conversion part 12, and junctions 13a and 13b unsealed but cause the surrounded space to communicate with the space outside the wavelength converter 100. In other words, the junctions 13a and 13b have the openings 13c, which cause the space surrounded by the base 11, the wavelength conversion part 12, and junctions 13a and 13b to communicate with the outside space.

In the wavelength converter 100 according to the present embodiment, part of the first surface 11b1 of the base 11 is curved in the direction +Z, which is a first direction, as shown in FIG. 4. The curved region of the first surface 11b1 is referred to as a first region 21. In the wavelength converter 100, a region of the second surface 12b1 of the wavelength conversion part 12, the region facing the first region 21, in other words, the region that coincides with the first region 21 in the plan view, is curved in the direction +Z. The curved region of the second surface 12b1 is referred to as a second region 22.

The curvature of the first surface 11b1 of the first region 21 is, for example, equal to the curvature of the second surface 12b1 of the second region 22. The thickness of the air layer 14 can therefore be made uniform across the entire region thereof. Since the first surface 11b1 of the first region 21 and the second surface 12b1 of the second region 22 are curved both in the direction +Z as described above, variation of the thickness of the air layer 14 between the first surface 11b1 and the second surface 12b1 can be suppressed. Substantially the same amount of air can therefore be taken in across the entire region of the air layer 14, whereby a decrease in the cooling efficiency can be suppressed.

In the present embodiment, the first region 21 of the base 11 is shaped in accordance with the curved shape of the second region 22 of the wavelength conversion part 12, which is prone to distortion. Examples of a method for curving the base 11 may include pressing, grinding, or bending with the aid of applied heat. In a case where the base 11 is curved, the second region 22 of the wavelength conversion part 12 may be shaped in accordance with the shape of the first region 21 of the base 11. In this case, it is conceivable to grind the wavelength conversion part 12 in such a way that the ground wavelength conversion part follows the curved base 11.

In the present embodiment, the junction 13 is in contact with the second region 22 of the wavelength conversion part 12 and the first region 21 of the base 11. In this case, the junction 13 is also curved.

As described above, the wavelength converter 100 according to the first embodiment includes the base 11 having the first surface 11b1, the wavelength conversion part 12, which has the second surface 12b1 facing the first surface 11b1 and converts the excitation light E, which belongs to the first wavelength band, into light that belongs to the second wavelength band different from the first wavelength band, the junctions 13a and 13b, which join the wavelength conversion part 12 and base 11 to each other, and the air layer 14 located in the region that the excitation light E enters and surrounded by the wavelength conversion part 12, the base 11, and the junctions 13a and 13b. The first surface 11b1 of the base 11 has the first region 21 curved in the direction +Z, which is the first direction, and the second surface 12b1 of the wavelength conversion part 12 has the second region 22 facing the first region 21 and curved in the direction +Z.

According to the configuration described above, since the first region 21 of the first surface 11b1 and the second region 22 of the second surface 12b1 are curved both in the direction +Z, variation of the thickness of the air layer 14 between the first surface 11b1 and the second surface 12b1 can be suppressed. Substantially the same amount of air can therefore be taken in across the entire region of the air layer 14, whereby a decrease in the cooling efficiency can be suppressed.

In the wavelength converter 100 according to the first embodiment, the curvature of the first surface 11b1 of the first region 21 and the curvature of the second surface 12b1 of the second region 22 is preferably equal to each other. According to the configuration described above, the curved region of the first surface 11b1 and the curved region of the second surface 12b1 have the same curvature, the thickness of the air layer 14 can be uniform across the entire region thereof, whereby the cooling efficiency can be improved.

The light source apparatus 500 according to the first embodiment includes the wavelength converter 100 described above and the first light source 10, which outputs the excitation light E. The configuration described above allows the light source apparatus 500 to suppress a decrease in the cooling efficiency and improve the reliability.

The projector 1000 according to the first embodiment includes the light source apparatus 500 described above, the exterior enclosure, the light modulators 400R, 400G, and 400B, which modulate the light outputted from the light source apparatus 500 in accordance with image information, and the projection optical apparatus 700, which projects the light modulated by the light modulators 400R, 400G, and 400B. The configuration described above allows the projector 1000 to improve the reliability.

A wavelength converter 101 according to a second embodiment will next be described with reference to FIG. 5.

Figure 5:
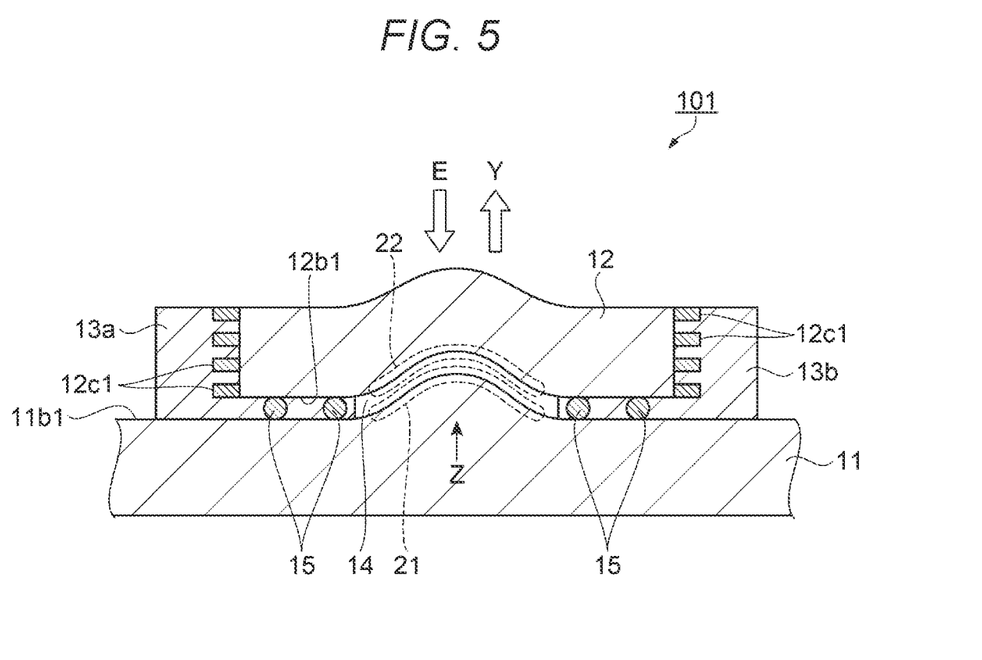
FIG. 5 is a cross-sectional view showing the configuration of the wavelength converter according to a second embodiment.

The wavelength converter 101 according to the second embodiment differs from the wavelength converter 100 according to the first embodiment in that the wavelength conversion part 12 is provided with protrusions 12c1, which are in contact with the junctions 13a and 13b, and spacers 15, which maintains the distance between the base 11 and the wavelength conversion part 12, as shown in FIG. 5. The other configurations are generally similar to those in the first embodiment. Therefore, in the second embodiment, the portions that are not provided in the first embodiment will be described in detail, and other duplicated portions will not be described as appropriate.

In the wavelength converter 101 according to the second embodiment, the first region 21 of the first surface 11b1 of the base 11 is curved in the direction +Z, and the second region 22 of the second surface 12b1 of the wavelength conversion part 12 is curved in the direction +Z, as in the first embodiment. The base 11 and the wavelength conversion part 12 are joined to each other via the junctions 13a and 13b. In the present embodiment, since the junction 13 is not in contact with the curved regions, the thickness of the junction 13 is desirably substantially uniform in the region where the first surface 11b1 of the base 11 faces the second region 22 of the second surface 12b1 of the wavelength conversion part 12.

The wavelength conversion part 12 in the second embodiment is provided with the protrusions 12c1, which are in contact with the junctions 13a and 13b, as described above. Specifically, the protrusions 12C1 are provided at the side surface of the wavelength conversion part 12. The protrusions 12c1 only need to increase the surface area where the wavelength conversion part 12 is in contact with the junctions 13a and 13b, and the number of protrusions 12c1 is not limited to a specific value, or the shape thereof is not limited to a specific shape. The protrusions 12C1 are made of the same material as that of the wavelength conversion part 12, but not necessarily. The protrusions 12cl are provided at the side surface of the wavelength conversion part 12 and therefore do not hamper the operation of grinding the wavelength conversion part 12 but allow the wavelength conversion part 12 to be readily processed.

Since the wavelength conversion part 12 is provided with the plurality of protrusions 12c1 so that the surface area of the wavelength conversion part 12 increases as described above, the adhesive strength between the wavelength conversion part 12 and the junctions 13a, 13b can be increased when the wavelength conversion part 12 comes into contact with the junctions 13a and 13b. Therefore, for example, separation of the wavelength conversion part 12 from the junctions 13a and 13b due to distortion of the wavelength conversion part 12 or any other factor can be suppressed.

The junctions 13a and 13b in the second embodiment have the plurality of spacers 15 in the circumferential direction of the circular base 11 or in directions perpendicular to the circumferential direction. The spacers 15 are, for example, glass beads. The spacers 15 are used to maintain the distance between the base 11 and the wavelength conversion part 12. The spacers 15 are, for example, spherical particles made of silica. The spacers 15 are so rigid that the spacers 15 themselves are not deformed when sandwiched between the base 11 and the wavelength conversion part 12. The spacers 15 each have, for example, a diameter of 1 μm.

In the wavelength converter 101 according to the second embodiment, the wavelength conversion part 12 preferably includes the plurality of protrusions 12cl in the region where the wavelength conversion part 12 is in contact with the junctions 13a and 13b, as described above. According to the configuration described above, the wavelength conversion part 12 includes the plurality of protrusions 12c1, which increase the surface area of the wavelength conversion part 12, whereby the adhesive strength between the wavelength conversion part 12 and the junctions 13a, 13b can be increased when the wavelength conversion part 12 comes into contact with the junctions 13a and 13b. Therefore, for example, separation of the wavelength conversion part 12 from the junctions 13a and 13b due to distortion of the wavelength conversion part 12 or any other factor can be suppressed. In addition, the larger surface area of the wavelength conversion part 12 can improve the cooling efficiency.

In the wavelength converter 101 according to the second embodiment, the junctions 13a and 13b preferably include the spacers 15, which are in contact with the base 11 and the wavelength conversion part 12 and maintain the distance between the base 11 and the wavelength conversion part 12. The configuration described above, which includes the spacers 15, can maintain a predetermined distance between the base 11 and the wavelength conversion part 12, whereby unevenness in the thickness of the air layer 14 across the entire region thereof can be suppressed.

It is further desirable that all the spacers 15 disposed between the base 11 and the wavelength conversion part 12 are in contact with the base 11 and the wavelength conversion part 12. It is, however, noted that unevenness in the thickness of the air layer 14 can be suppressed as long as at least one pair of spacers 15 facing each other in a direction perpendicular to the circumferential direction of the circular base 11 are in contact with the base 11 and the wavelength conversion part 12.

Variations of the embodiments described above will be described below.

The first surface 11b1 of the base 11 and the second surface 12b1 of the wavelength conversion part 12 are not necessarily curved in the direction +Z, as in the first embodiment described above, and may instead be curved as shown in FIG. 6.

Figure 6:
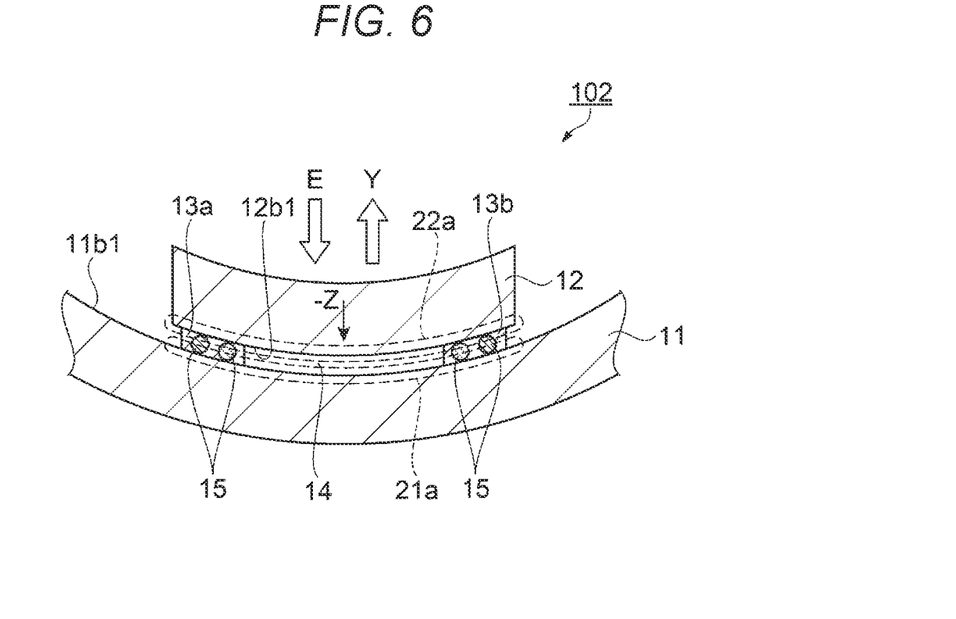
FIG. 6 is a cross-sectional view showing the configuration of the wavelength converter according to a variation.

In a wavelength converter 102 according to a variation, the first surface 11b1 of the base 11 and the second surface 12b1 of the wavelength conversion part 12 are curved in the direction −Z, as shown in FIG. 6. Specifically, a first region 21a of the base 11 and a second region 22a of the wavelength conversion part 12, which affect at least the excitation light E and the fluorescence Y, are curved both in the direction −Z. The curvature of the first surface 11b1 of the first region 21a is equal to the curvature of the second surface 12b1 of the second region 22a.

As described above, in the wavelength converter 102 according to the variation, the first region 21a of the first surface 11b1 and the second region 22a of the second surface 12b1 are curved in the same direction, whereby variation of the thickness of the air layer 14 between the first surface 11b1 and the second surface 12b1 can be suppressed. Substantially the same amount of air can therefore be taken in across the entire region of the air layer 14, whereby a decrease in the cooling efficiency can be suppressed.

Figure 7:
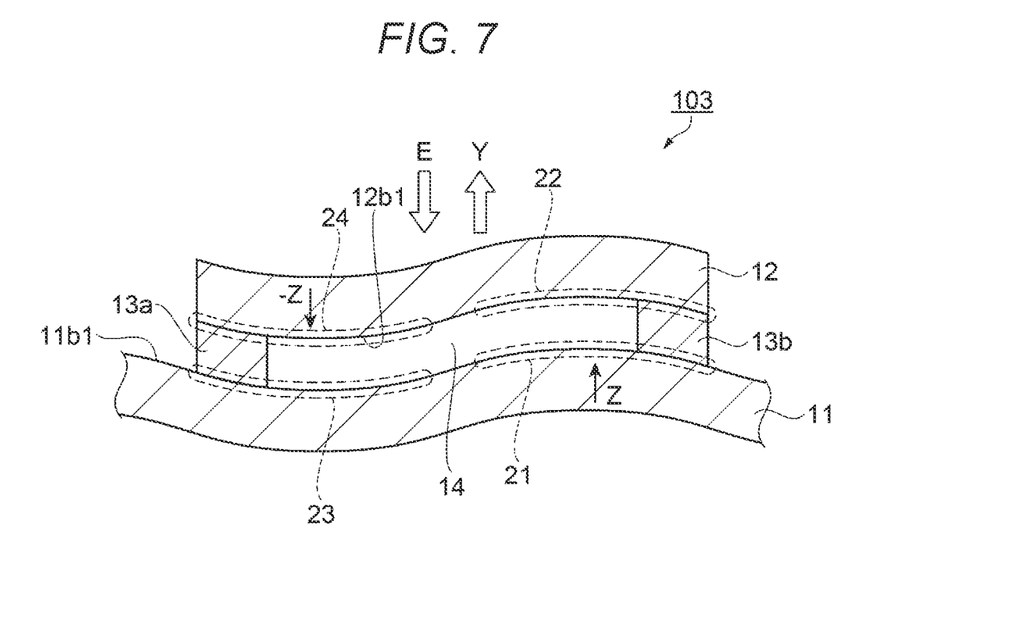
FIG. 7 is a cross-sectional view showing the configuration of the wavelength converter according to another variation.

A configuration in which the base 11 and the wavelength conversion part 12 have a wavy shape may be employed, as in a wavelength converter 103 according to a variation shown in FIG. 7.

In the wavelength converter 103 according to the variation, the first region 21 of the first surface 11b1 of the base 11 is curved in the direction +Z, and the second region 22 of the second surface 12b1 of the wavelength converter 12 is curved in the same direction or the direction +Z, as shown in FIG. 7. On the other hand, a third region 23 of the first surface 11b1 of the base is curved in the direction −Z, which is a second direction that differs from the direction +Z or the direction opposite thereto. A fourth region 24 of the second surface 12b1 of the wavelength conversion part 12 is curved in the direction −Z, as the third region 23 is. The fourth region 24 is a region facing the third region 23. The curvature of the first surface 11b1 of the third region 23 is equal to the curvature of the second surface 12b1 of the fourth region 24. That is, the first surface 11b1 and the second surface 12b1 are wavy surfaces.

As described above, in the wavelength converter 103 according to the variation, the first surface 11b1 of the base 11 has the third region 23 curved in the direction −Z, which differs from the direction +Z, and the second surface 12b1 of the wavelength conversion part 12 has the fourth region 24 facing the third region 23 and curved in the direction −Z. According to the configuration described above, also when the first and second surfaces are curved in the direction +Z and in the direction −Z, which differs from the direction +Z, in other words, when the first and second surfaces are curved in a wavy shape, the first and second surfaces are curved in the same direction in the regions where the first and second surfaces face each other, whereby variation of the thickness of the air layer 14 can be suppressed across the entire region thereof.

In the wavelength converter 103 according to the variation, the curvature of the first surface 11b1 of the third region 23 is equal to the curvature of the second surface 12b1 of the fourth region 24. According to the configuration described above, the curved region of the first surface 11b1 and the curved region of the second surface 12b1 have the same curvature, the thickness of the air layer 14 can be uniform across the entire region thereof, whereby the cooling efficiency can be improved.

Figure 8:
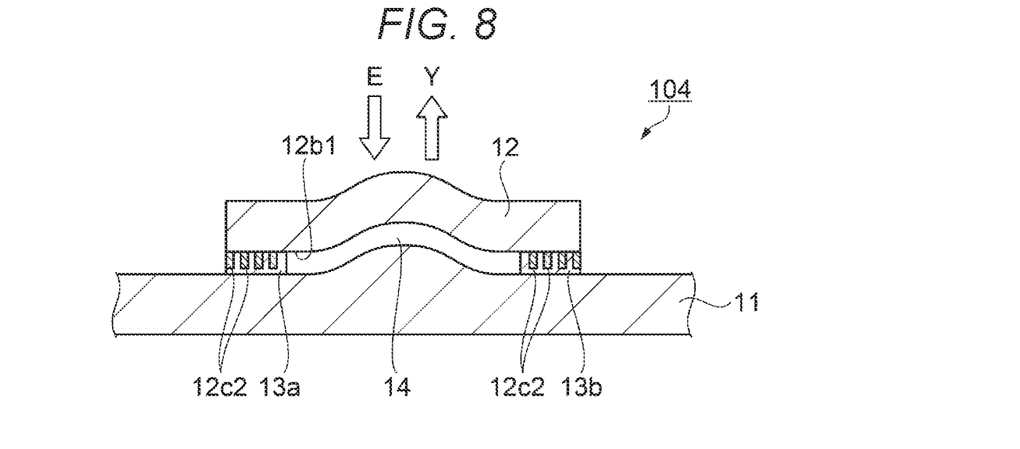
FIG. 8 is a cross-sectional view showing the configuration of the wavelength converter according to another variation.
Figure 9:
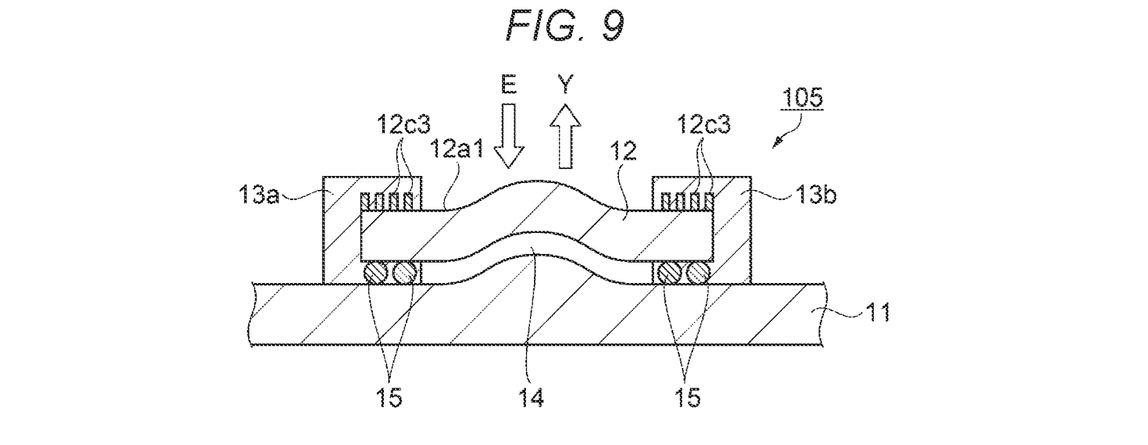
FIG. 9 is a cross-sectional view showing the configuration of the wavelength converter according to another variation.
Figure 10:
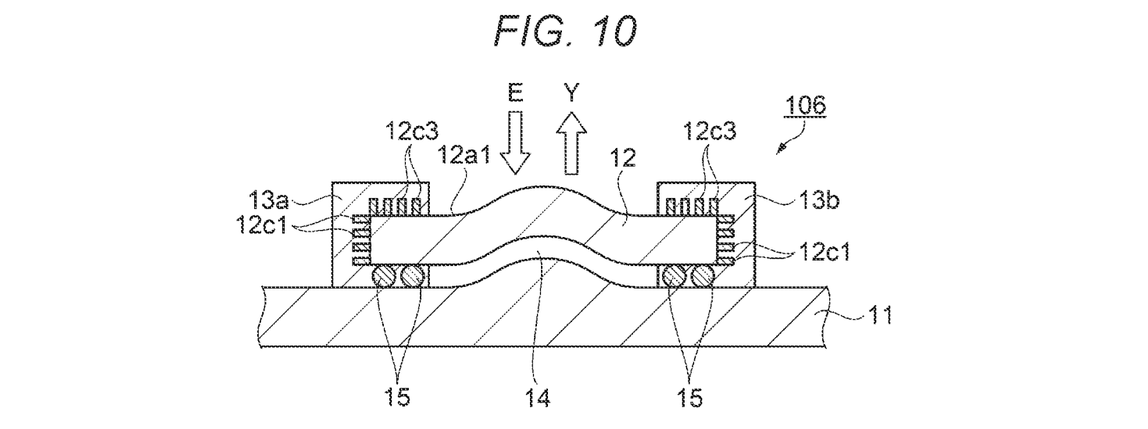
FIG. 10 is a cross-sectional view showing the configuration of the wavelength converter according to another variation.

The configurations of wavelength converters 104, 105, and 106 shown in FIGS. 8, 9, and 10 may also be employed.

The wavelength converter 104 according to a variation shown in FIG. 8 differs from the wavelength converter 101 according to the second embodiment in that protrusions 12c2 of the wavelength conversion part 12 are provided on the side facing the second surface 12b1. Ends of the protrusions 12c2, the ends opposite to the wavelength conversion part 12, may be in contact with the first surface 11b1. In this case, the distance between the base 11 and the wavelength conversion part 12 can be maintained at a predetermined distance by setting the size of the protrusions 12c2, so that there is no need to dispose the spacers 15 in the junctions 13a and 13b.

In the wavelength converter 105 according to a variation shown in FIG. 9, protrusions 12c3 of the wavelength conversion part 12 are provided on the side facing the light incident surface 12a1. The spacers 15 are disposed between the base 11 and the wavelength conversion part 12, as in the second embodiment.

In the wavelength converter 106 according to a variation shown in FIG. 10, the protrusions 12cl and 12c3 of the wavelength conversion part 12 are provided in two directions: the direction facing the side surface of the wavelength conversion part 12; and the direction facing the light incident surface 12al. The thus formed wavelength converter 106 is preferable in terms of an increase in the surface area where the wavelength conversion part 12 is in contact with the junctions 13a and 13b and in terms of easy adjustment of the thickness of the air layer 14.

The wavelength converters 100 to 106 are each not limited to a reflective wavelength converter that reflects the excitation light E, and may instead be a transmissive wavelength converter. Specifically, the excitation light E is incident from the side facing the base 11, and the fluorescence Y is emitted toward the wavelength conversion part 12. In this case, the base 11 is preferably made of a transparent material having high thermal conductivity, such as sapphire.

In the wavelength converters 100 to 106, the curved regions are not necessarily curved in the direction along the line A-A' shown in FIG. 3, and the configurations of the embodiments and variations described above are also applicable to the wavelength converters 100 to 106 in which the curved regions are curved in the circumferential direction of the wavelength conversion part 12 formed in an annular shape. That is, in the wavelength converters 100 to 106 each including the wavelength conversion part 12 formed in an annular shape, the first region 21 of the first surface 11b1 of the base 11 is curved in the direction +Z, and the second region 22 of the second surface 12b1 of the wavelength conversion part 12 is curved in the same direction or the direction +Z. On the other hand, the third region 23 of the first surface 11b1 of the base is curved in the direction −Z, which is the second direction, which differs from the direction +Z or the direction opposite thereto. The fourth region 24 of the second surface 12b1 of the wavelength conversion part 12 is curved in the direction −Z, as the third region 23 is. The second region 22 faces the first region 21, and the fourth region 24 faces the third region 23. The second region 22 is provided along the circumference of the wavelength conversion part 20 with respect to the fourth region 24, and the first region 21 is provided along the circumference of the wavelength conversion part 20 with respect to the third region 23.

The wavelength converter 100 according to the first embodiment does not necessarily have the configuration in which there are no spacers 15 in the junctions 13a and 13b, and may have the configuration in which the spacers 15 are provided in the junctions 13a and 13b, as in the second embodiment.

What is claimed is:

1. A wavelength converter comprising:
a base having a first surface;
a wavelength conversion part that has a second surface facing the first surface and converts first light that belongs to a first wavelength band into second light that belongs to a second wavelength band different from the first wavelength band;
a junction that joins the wavelength conversion part and the base to each other; and
an air layer located in a region that the first light enters and surrounded by the wavelength conversion part, the base, and the junction,
wherein the first surface of the base has a first region curved in a first direction,
the second surface of the wavelength conversion part has a second region facing the first region and curved in the first direction,
the wavelength converter emits the second light toward the same side as the side on which the first light is incident, and
the wavelength conversion part includes a plurality of protrusions in a region where the wavelength conversion part is in contact with the junction.

2. The wavelength converter according to claim 1, wherein the junction includes a spacer that is in contact with the base and the wavelength conversion part and maintains a distance between the base and the wavelength conversion part.

3. The wavelength converter according to claim 1, wherein the first surface of the base has a third region curved in a second direction different from the first direction, and
the second surface of the wavelength conversion part has a fourth region facing the third region and curved in the second direction.

4. The wavelength converter according to claim 1, wherein curvature of the first surface of the first region is equal to curvature of the second surface of the second region.

5. A light source apparatus comprising:
the wavelength converter according to claim 1; and
a light emitter that outputs the first light.

6. The wavelength converter according to claim 3, wherein curvature of the first surface of the third region is equal to curvature of the second surface of the fourth region.

7. A projector comprising:
the light source apparatus according to claim 5;
an exterior enclosure;
a light modulator that modulates light emitted from the light source apparatus in accordance with image information; and
a projection optical apparatus that projects the light modulated by the light modulator.

* * * * *